US008725080B2

(12) United States Patent
Stankovska et al.

(10) Patent No.: US 8,725,080 B2
(45) Date of Patent: May 13, 2014

(54) METHOD AND APPARATUS FOR TRANSMISSION IN A TRUNKED RADIO COMMUNICATION SYSTEM

(75) Inventors: Daniela Stankovska, Fort Lauderdale, FL (US); Gabriel N. Bocan, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 196 days.

(21) Appl. No.: 13/339,624

(22) Filed: Dec. 29, 2011

(65) Prior Publication Data

US 2013/0171934 A1    Jul. 4, 2013

(51) Int. Cl.
*H04B 1/00* (2006.01)
*H04B 15/00* (2006.01)

(52) U.S. Cl.
USPC ......... 455/63.1; 455/41.2; 455/501; 455/509; 455/519; 455/511; 370/337; 370/347

(58) Field of Classification Search
USPC ............. 455/63.1, 518, 519, 456.1, 450, 509, 455/452.1, 510, 511, 20, 501, 512, 432.1, 455/41.2; 370/337, 347
See application file for complete search history.

(56) References Cited

U.S. PATENT DOCUMENTS

| | | | | |
|---|---|---|---|---|
| 5,483,575 A | * | 1/1996 | Zdanowski et al. | 455/508 |
| 5,528,691 A | * | 6/1996 | Rosauer et al. | 380/273 |
| 5,852,781 A | * | 12/1998 | Ahvenainen | 455/509 |
| 5,901,363 A | * | 5/1999 | Toyryla | 455/527 |
| 5,930,723 A | * | 7/1999 | Heiskari et al. | 455/518 |
| 6,141,533 A | * | 10/2000 | Wilson et al. | 455/11.1 |
| 6,230,015 B1 | * | 5/2001 | Kinnunen et al. | 455/450 |
| 6,272,353 B1 | * | 8/2001 | Dicker et al. | 455/517 |
| 6,847,997 B1 | * | 1/2005 | Kleiner | 709/224 |
| 7,006,451 B2 | * | 2/2006 | Kuwahara | 370/252 |
| 7,110,374 B2 | * | 9/2006 | Malhotra et al. | 370/329 |
| 7,254,406 B2 | | 8/2007 | Beros et al. | |
| 7,313,123 B2 | | 12/2007 | Haartsen | |
| 7,768,967 B1 | * | 8/2010 | Mangal | 370/329 |
| 7,983,222 B2 | | 7/2011 | Giaimo et al. | |
| 8,023,899 B2 | * | 9/2011 | Morton et al. | 455/63.1 |
| 8,072,919 B2 | * | 12/2011 | Jiang et al. | 370/320 |
| 8,335,533 B2 | * | 12/2012 | Chion et al. | 455/519 |
| 8,463,290 B2 | * | 6/2013 | Rhoads | 455/456.1 |

(Continued)

OTHER PUBLICATIONS

Almaula, V., and Cheng, D., "Bluetooth Triangulator," pp. 5.

(Continued)

*Primary Examiner* — Marceau Milord
(74) *Attorney, Agent, or Firm* — Randi L. Karpinia; Steven A. May; Daniel R. Bestor (57) ABSTRACT

A method and apparatus for transmission in a trunked radio communication system comprises a first mobile radio subscriber unit receiving identity data from one or more other mobile radio subscriber units. The first mobile radio subscriber unit detects the distance from the first mobile radio subscriber unit to each of the one or more other mobile radio subscriber units. This information is transmitted to the infrastructure of the system, which selects a communication channel for the first mobile radio subscriber unit, so as to reduce close proximity interference between the mobile radio subscriber units. The mobile radio subscriber units may check for blocking conditions prior to initiating communication, and when necessary may delay transmission. The check may be based on information received via Bluetooth from other mobile radio subscriber units, and Bluetooth signal strength information.

25 Claims, 7 Drawing Sheets

(56) References Cited

U.S. PATENT DOCUMENTS

| | | | |
|---|---|---|---|
| 8,505,095 B2 * | 8/2013 | Mahaffey | 726/22 |
| 8,520,624 B2 * | 8/2013 | Husted et al. | 370/329 |
| 2002/0098849 A1 | 7/2002 | Bloebaum et al. | |
| 2004/0009750 A1 | 1/2004 | Beros et al. | |
| 2005/0048985 A1 | 3/2005 | Haartsen | |
| 2006/0068800 A1 | 3/2006 | Ruelke | |
| 2007/0223434 A1 | 9/2007 | Bennett | |
| 2008/0013502 A1 | 1/2008 | Clark | |
| 2009/0067447 A1 | 3/2009 | Giaimo et al. | |
| 2010/0093364 A1 | 4/2010 | Riebeiro | |

OTHER PUBLICATIONS

Aryafar, E., et al., "Distance 1 Constrained Channel Assingment in Single Radio Wireless Mesh Networks," pp. 9.

Cui, Y., et al., "Partially Overlapping Channel Assigment Based on "Node Orthogonality" for 802.11 Wireless Networks," pp. 5.

PCT International Search Report date mailed Apr. 19, 2013 corresponding to PCT/US2012/069673.

* cited by examiner

METHOD AND APPARATUS FOR TRANSMISSION IN A TRUNKED RADIO COMMUNICATION SYSTEM

FIELD OF THE DISCLOSURE

The present disclosure relates generally to transmission in a trunked radio communication system and more particularly to reducing interference in a trunked two-way radio communication system.

BACKGROUND

Figure 1:
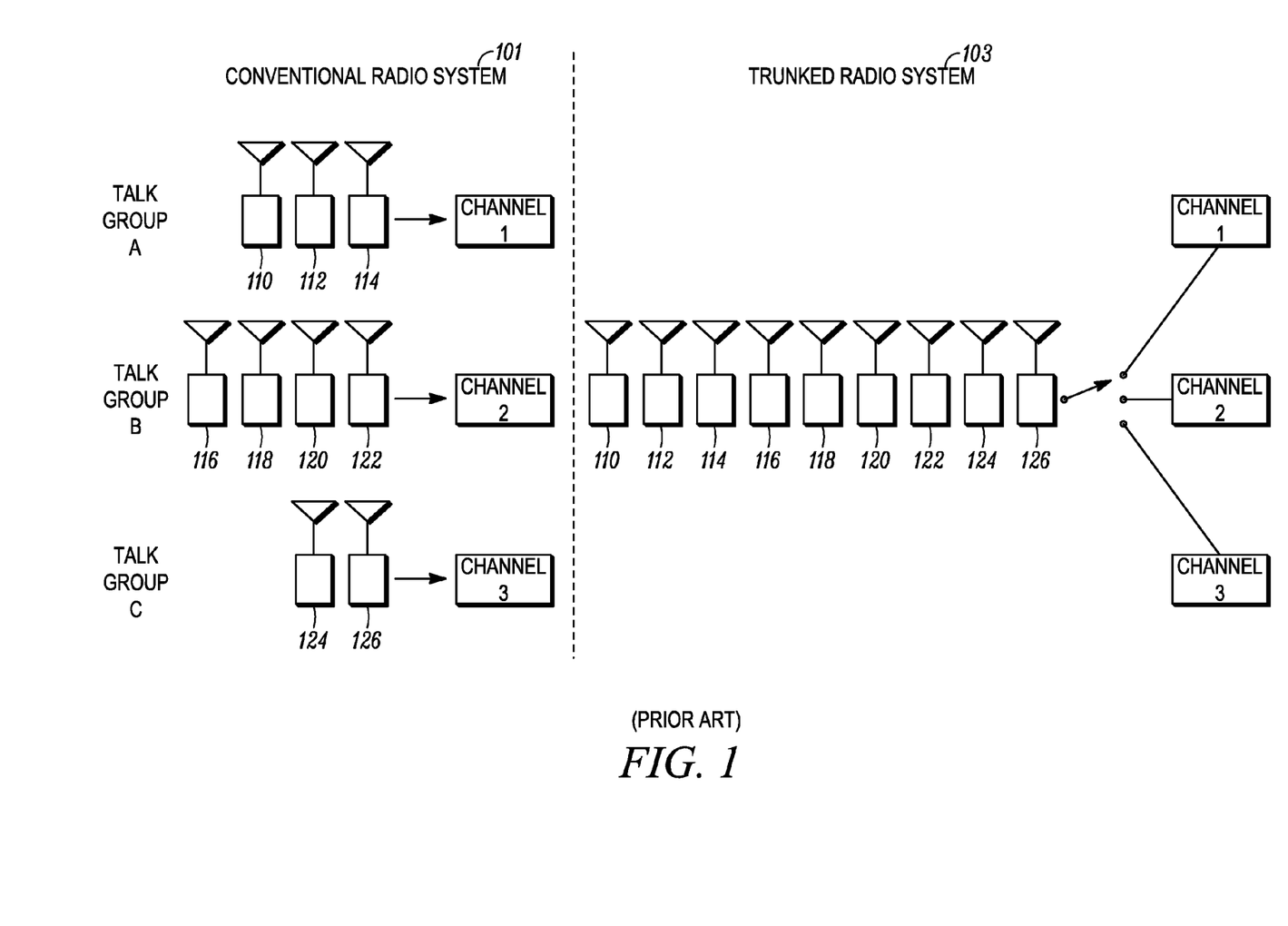
FIG. 1 is a schematic that compares known two-way radio communication systems.

Many varieties of trunked two-way radio communications systems are known. FIG. 1 is a block diagram illustrating both a typical conventional radio system 101 and a trunked radio system 103.

In the conventional radio system 101, a plurality of mobile radio subscriber units 110, 112, 114, 116, 117, 118, 120, 122, 124, 126 are formed into talkgroups A, B or C. Each talkgroup uses a separate channel for communication. The channels in use in FIG. 1 are shown as 'Channel 1', 'Channel 2' and 'Channel 3'. Thus, each talkgroup is served by one channel.

In contrast, the trunked radio system 103 and its mobile radio subscriber units 110, 112, 114, 116, 117, 118, 120, 122, 124, 126 use a pool of channels, 'Channel 1', 'Channel 2' or 'Channel 3'. All talkgroups may in fact be served by any channel, and may well be served by all channels at different times. These channels can support a virtually unlimited number of talkgroups. The trunked radio system 103 works to take advantage of the probability that not all talkgroups will need a channel for communication at the same time. Estimates are made about how much load a typical user will present to the system, in terms of calls per hour and duration of each call.

For a given traffic load, the trunked radio system 103 requires fewer channels, since all talkgroups can be served by all channels. The number of trunked channels required to provide satisfactory service depends on: (i) the number of users; (ii) the traffic load that each will present; and (iii) the acceptable quality of service (QoS). With any given number of channels, the trunked radio system 103 can accommodate a much greater number of talkgroups than conventional radio systems, such as radio system 101. Hence, a primary benefit of a trunked radio system is the efficient utilization of channels. The trunked radio system allows more users to carry on more conversations, over fewer distinct channels. This applies to data and/or voice calls.

Figure 2:
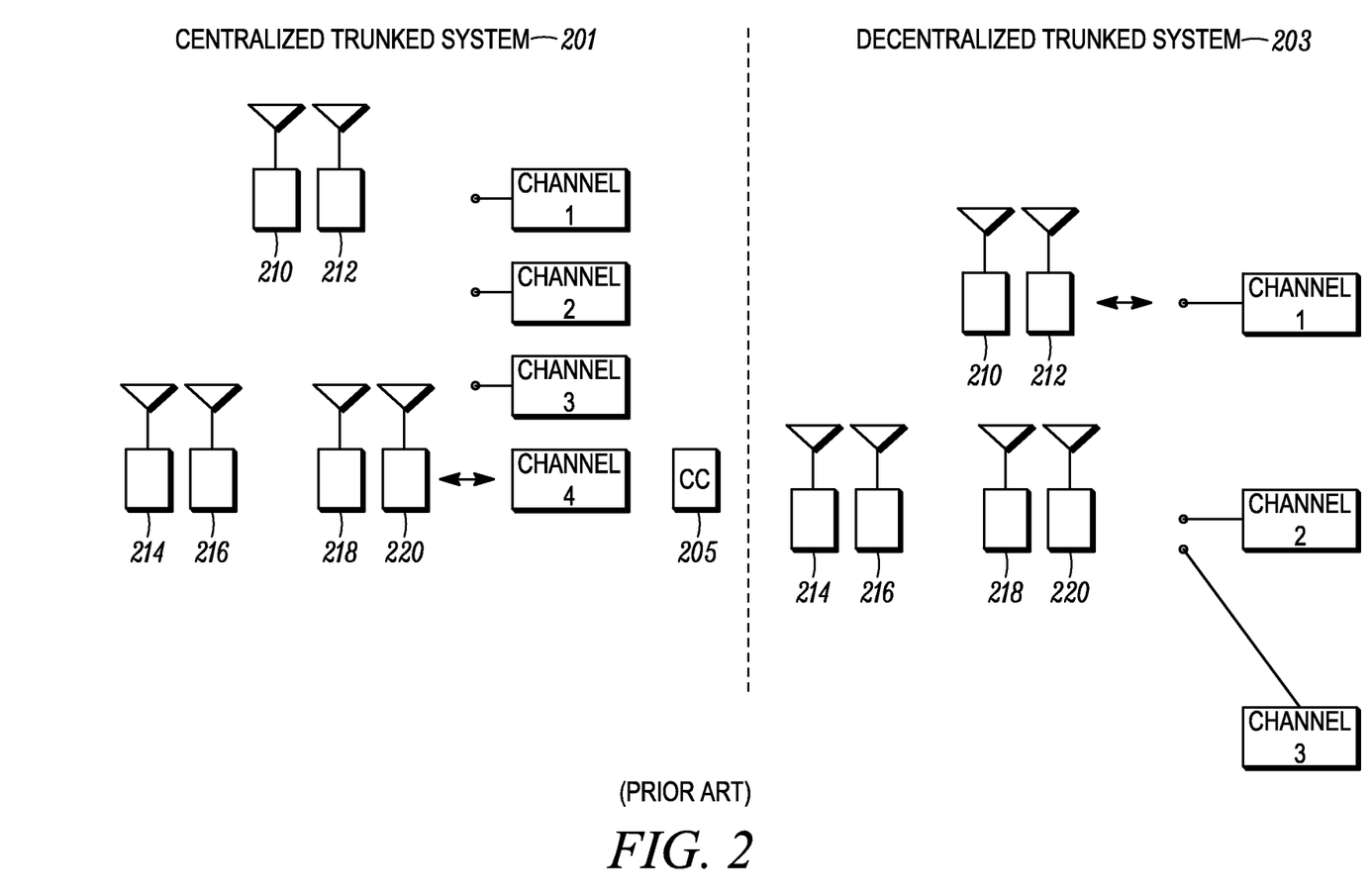
FIG. 2 is a schematic showing illustrative details of known trunked two-way radio communications systems.

As seen in FIG. 2, a trunked radio system can be either a 'centralized trunked' radio system 201 or a 'decentralized trunked' radio system 203.

A centralized trunked radio system 201 uses a dedicated or exclusive channel for communication between mobile radio subscriber units 210, 212, 214, 216, 218, 220, and a central controller 205. This dedicated channel is often referred to as a control channel. The control channel communicates information about call 'set-up' and 'tear-down' between the mobile radio subscriber units 210, 212, 214, 216, 218, 220, and the central controller 205. Other terms that sometimes refer to the central controller 205 include 'trunking controller', 'site controller', 'resource allocator', 'channel allocator', 'controller', and other like terms. The mobile radio subscriber units 210, 212, 214, 216, 218, 220 constantly monitor the control channel for channel assignment instructions. In order to start a group call, i.e. a one-to-many call, a mobile radio subscriber unit requests that a channel be allocated for its use. The central controller 205 then transmits instructions, which tell the mobile radio subscriber units in the group to switch to a traffic channel 'Channel 1', 'Channel 2', 'Channel 3' or 'Channel 4' assigned for that call. A similar process is followed when a mobile radio subscriber unit starts an individual call, i.e. a ' one-to-one' call.

A decentralized trunked radio system 203, however, does not require the use of an exclusive channel 'Channel 1', 'Channel 2' or 'Channel 3'. The intelligence or control function for assignment of a channel to a call remains in the mobile radio subscriber units 210, 212, 214, 216, 218, 220. Thus, the decentralized trunked radio system 203 can co-exist with conventional users on the same channels, without the use of the control channel. When a call is initiated by a mobile radio subscriber unit, the channel assignment is determined by the logic in the mobile radio subscriber units 210, 212, 214, 216, 218, 220, not by a controller. In operation, a mobile radio subscriber unit scans the channels, finds an idle channel and starts a call on the idle channel. The disadvantage of the decentralized trunked radio system 203 is that the scan to find an idle channel significantly increases the access time, which often provides for unacceptably high latency delays during call set up.

In a trunked communication system, each call is assigned one channel. The channel comprises two frequencies. At a base station of the trunked communication system, one frequency is used to receive a call from a mobile radio subscriber unit. This first frequency is referred to as the 'Rx' or 'receive' unit. The function of the base station is to re-transmit the call to the other members of a talk group. A second frequency is used for that re-transmission. This second frequency is referred to as the 'Tx' or 'transmit' frequency.

Henceforth the term 'mobile radio subscriber unit' will be used for any wirelessly linked mobile communication device that may be linked to the trunked wireless communication system discussed in the remainder of this description. The mobile radio subscriber unit may, for example, be a mobile or portable radio, or another wirelessly linked mobile communication device. The trunked radio system may comprise an 'infrastructure'. The infrastructure typically comprises a network of linked base stations. A base station communicates directly with mobile radio subscriber units. The mobile radio subscriber units can communicate with each other, via the base station. The mobile radio subscriber units may also be able to place and receive calls through to other, separate communication systems.

Many currently deployed trunked radio systems use a dedicated control (data) channel, common for all mobile radio subscriber units in a particular site, and multiple voice channels. The voice channels are dynamically assigned by the infrastructure of the system to the different talkgroups. This is the design explained as the 'centralized trunked system' in FIG. 2.

In typical applications, the radio frequency (RF) receiver in a mobile radio subscriber unit must tolerate large interfering signals. Some interfering signals emanate from other mobile radio subscriber units that are actively communicating in adjacent channels. Another source of interfering signals may be transmissions from sources with large transmission power, even if those transmissions are relatively far removed in frequency. Here 'relatively far' means that the transmission frequencies are further from the mobile radio subscriber unit's reception frequency than just the immediately adjacent channels. Such high powered transmissions, even in very different frequencies, can cause significant interference problems.

The interfering signals lead to one or more large undesired signals being introduced into a mobile radio subscriber unit's receiver RF passband. When this happens, the receiver gain drops. In addition, the receiver's noise level increases, due to the resulting compression and nonlinearities. The consequence is that there is degradation of the signal-to-noise ratio and the receiver sensitivity. This phenomenon caused by the large close proximity interference signals is called 'blocking'. One case when blocking affects the user experience may, for example, occur when two or three radios transmit simultaneously, in close proximity. These may be radios that belong to different talk groups of the trunked radio communication system. A receiving mobile radio subscriber unit that is also in a close proximity cannot then access the radio trunked system, due to its receiver being blocked.

A known approach to reducing interference in links between a base station and mobile radio subscriber units is to evaluate parameters relating to the quality of individual communication links. After such evaluation, transmission attributes can be selected so as to optimize transmission quality of each link.

Accordingly, there is a need for a method and apparatus for transmission in a trunked radio communication system, whereby some or all of the above disadvantages are overcome.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method of initiating transmission, by a mobile radio subscriber unit in a trunked radio system, comprises a first mobile radio subscriber unit receiving data from at least one other radio subscriber unit. The data for each of the least one other radio subscriber units comprises identification data, and data about transmission/reception activity by each of the least one other radio subscriber units. The first mobile radio subscriber unit determines the received signal power of signals from the least one other radio subscriber units. The first mobile radio subscriber unit determines whether transmission by the first mobile radio subscriber unit would provide interference above a first pre-determined level, or reception by the first mobile radio subscriber unit would be subject to interference above a second pre-determined level. The first mobile radio subscriber unit delays transmission, when transmission by the first mobile radio subscriber unit would provide interference above the first pre-determined level, or reception by the first mobile radio subscriber unit would be subject to interference above the second pre-determined level.

A mobile radio subscriber unit is operable in a trunked radio system. A receiver of the mobile radio subscriber unit is configured to receive data from at least one other radio subscriber unit, the data for each of the least one other radio subscriber units comprising identification data, and data about transmission/reception activity by each of the least one other radio subscriber units. A processor of the mobile radio subscriber unit is further configured to determine the received signal power of signals from the at least one other radio subscriber units. The processor is configured to determine whether transmission by the first mobile radio subscriber unit would provide interference above a first pre-determined level, and/or whether reception by the first mobile radio subscriber unit would be subject to interference above a second pre-determined level. The processor is configured to delay transmission by the mobile radio subscriber unit, when transmission by the first mobile radio subscriber unit would provide interference above the first pre-determined level, and/or reception by the first mobile radio subscriber unit would be subject to interference above the second pre-determined level.

A method of channel assignment in a trunked radio system comprises a first mobile radio subscriber unit receiving identity data, from one or more other mobile radio subscriber units, and detecting the distance from the first mobile subscriber unit to each of the one or more other mobile radio subscriber units. The first mobile radio subscriber unit transmits information to the infrastructure, the information comprising the identity data and detected distances of the one or more other mobile radio subscriber units. The infrastructure selects a communication channel for the first mobile radio subscriber unit, from a set of available communication channels, the selected communication channel being chosen to reduce close proximity interference between the first mobile radio subscriber unit and the one or more other mobile radio subscriber units.

Figure 3:
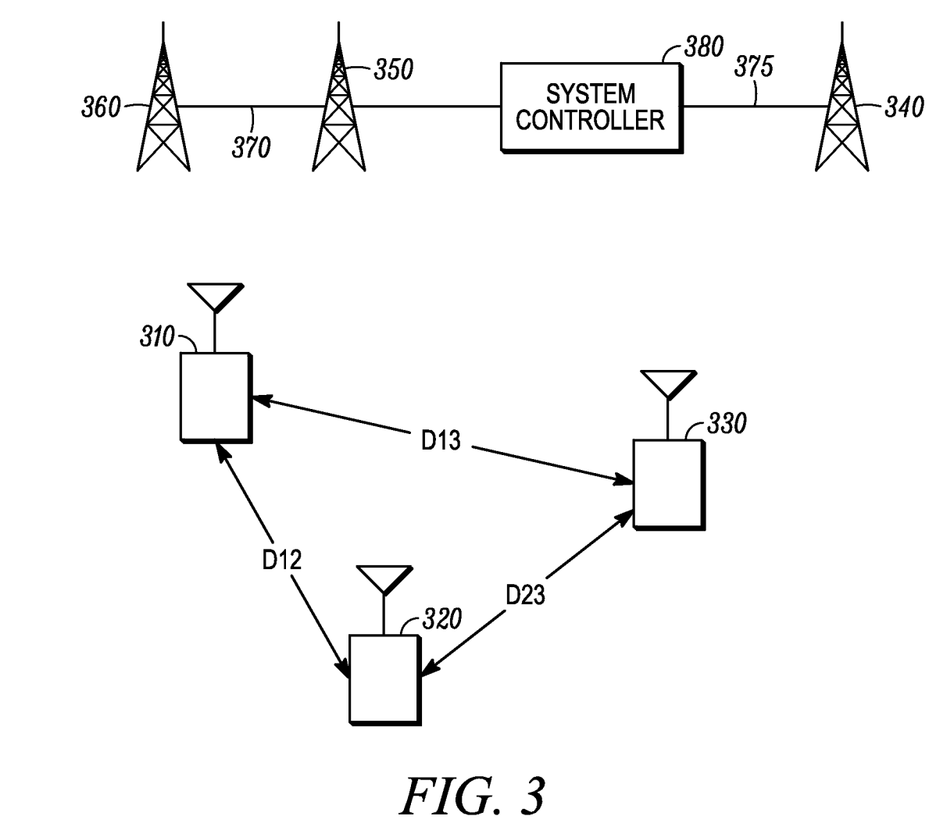
FIG. 3 is a schematic of a portion of a trunked two-way radio communications system.

FIG. 3 is a schematic view of a portion of a trunked two-way radio communications system.

First mobile radio subscriber unit 310 is operable to communicate via first base station 340. Base station 340 is part of the infrastructure of a trunked two-way radio communication system. The infrastructure may also, for example, comprise further base stations. Two further base stations, second base station 350 and third base station 360 are shown. The base stations of the infrastructure may be linked by physical connections, such as exemplary links 370 and 375 shown in FIG. 3. Alternatively, the base stations of the infrastructure may be wirelessly linked. System controller 380 is part of the infrastructure of the trunked two-way radio communication system. System controller 380 may provide processing functionality for managing the calls sent via first base station 340. System controller 380 may also implement the operations of the invention that are not specifically stated as being carried out in the mobile radio subscriber units. In addition, some functionality described herein as being implemented by the mobile radio subscriber units may, in alternative embodiments, be carried out by the infrastructure, such as by system controller 380.

Mobile radio subscriber unit 310 may communicate with at least one other mobile radio subscriber unit. Second mobile radio subscriber unit 320, having reference 320, and third mobile radio subscriber unit 330, having reference 330, are shown on FIG. 3.

The probability of first mobile radio subscriber unit 310 causing or suffering interference, depends on its geographical distance from other mobile radio subscriber units. The geographical distance between first mobile radio subscriber unit 310 and second mobile radio subscriber unit 320 is indicated as first distance D12. The geographical distance between first mobile radio subscriber unit 310 and third mobile radio subscriber unit 330 is indicated as second distance D13. Third distance D23 is also shown on FIG. 3. Third distance D23 is the geographical distance between second mobile radio subscriber unit 320 and third mobile radio subscriber unit 330.

First mobile radio subscriber unit 310 may receive data from the second radio subscriber unit 320. First mobile radio subscriber unit 310 may also, or alternatively, receive data from third mobile radio subscriber unit 330 and/or other mobile radio subscriber units not shown on FIG. 3. These mobile radio subscriber units may or may not be part of one talkgroup. The data received by mobile subscriber unit 310 may comprise identification data. The identification data may, for example, be a Bluetooth™ address of the second, third and/or other mobile radio subscriber unit, and may be obtained using the Bluetooth 'discoverable' mode. Bluetooth is a short-range wireless technology, typically able to provide communication over a distance of around 50 meters. Bluetooth 'modules' comprise circuitry, such as an integrated circuit, designed to transmit and receive Bluetooth signals. Bluetooth modules are fitted to a variety of communications equipment. Further technical details are available at: www.bluetooth.com.

The received data may include data about transmission/reception activity by each of the second mobile radio subscriber unit 320, third mobile radio subscriber unit 330 and/or other radio subscriber units. First mobile radio subscriber unit 310 is configured to determine the received signal power of the signals received from the at least one other mobile radio subscriber unit. Using this information, first mobile radio subscriber unit 310 may determine whether its transmissions would provide interference to other mobile radio subscriber units, above a first predetermined interference level. The mobile radio subscriber unit delays transmission, if its transmissions would provide such interference. First mobile radio subscriber unit 310 may also, or instead, determine whether its ability to receive signals would be affected by interference above a second pre-determined level. If so, then first mobile radio subscriber unit 310 delays transmission.

First mobile radio subscriber unit 310 may determine the received signal power of signals from one or more other radio subscriber units using Bluetooth discoverable mode. This enables the first mobile radio subscriber unit 310 to receive Bluetooth transmissions from the other radio subscriber units. Those transmissions may include an identity of the other radio subscriber unit. Bluetooth functionality may be implemented in second mobile radio subscriber unit 320 and/or third mobile radio subscriber unit 330 by a Bluetooth module. The 'Bluetooth' identity information for any mobile radio subscriber unit 310 will be tied to the unique identity of the mobile radio subscriber unit 310, which is known to the system's infrastructure, such as system controller 380.

First mobile radio subscriber unit 310 may measure Received Signal Strength Information (RSSI), for received Bluetooth transmissions. The RSSI measurement provides information about distances such as first distance D12 and second distance D13 in FIG. 3. The RSSI measurement also enables first mobile radio subscriber unit 310 to compute the interference power that would result from transmission by the first mobile radio subscriber. In addition or instead, first mobile radio subscriber unit 310 may use the RSSI measurement to determine whether reception of signals by the mobile radio subscriber unit 310 would be subject to interference as a consequence of other transmissions, from the other mobile radio subscriber units. Third distance D23 may be determined by one or both of second mobile radio subscriber unit 320 and third mobile radio subscriber unit 330, and may not be needed by first mobile radio subscriber unit 310.

First mobile radio subscriber unit 310 may determine, from data about reception activity by one or more other radio subscriber units 320, 330 that there is at least one radio in receive mode. This in turn allows first mobile radio subscriber unit 310 to determine whether transmission by the first mobile radio subscriber unit 310, alone or in combination with other transmitting radios, would block reception by the other radio subscriber units. First mobile radio subscriber unit 310 may determine, from data about transmission activity by one or more other radio subscriber units 320, 330, whether there is at least one radio in transmit mode. This in turn allows first mobile radio subscriber unit 310 to determine whether transmissions by the at least one other radio in transmit mode would block reception by first mobile radio subscriber unit 310, or reception by one or more of the other mobile radio subscriber units 320, 330.

When a mobile radio subscriber unit used on a trunked system is powered up, it will start scanning its preprogrammed list of control channels. When the mobile radio subscriber unit has found a control channel, it will attempt to initiate a call to the infrastructure of the trunked radio communication system. The purpose of the call is for the mobile radio subscriber unit to affiliate with the trunked radio communication system. Affiliation may be achieved either by: (i) transmitting simple identity (ID) information for the radio, in 'push-to-talk' (PTT) mode; or (ii) by the radio following an auto-affiliation process.

Figure 4:
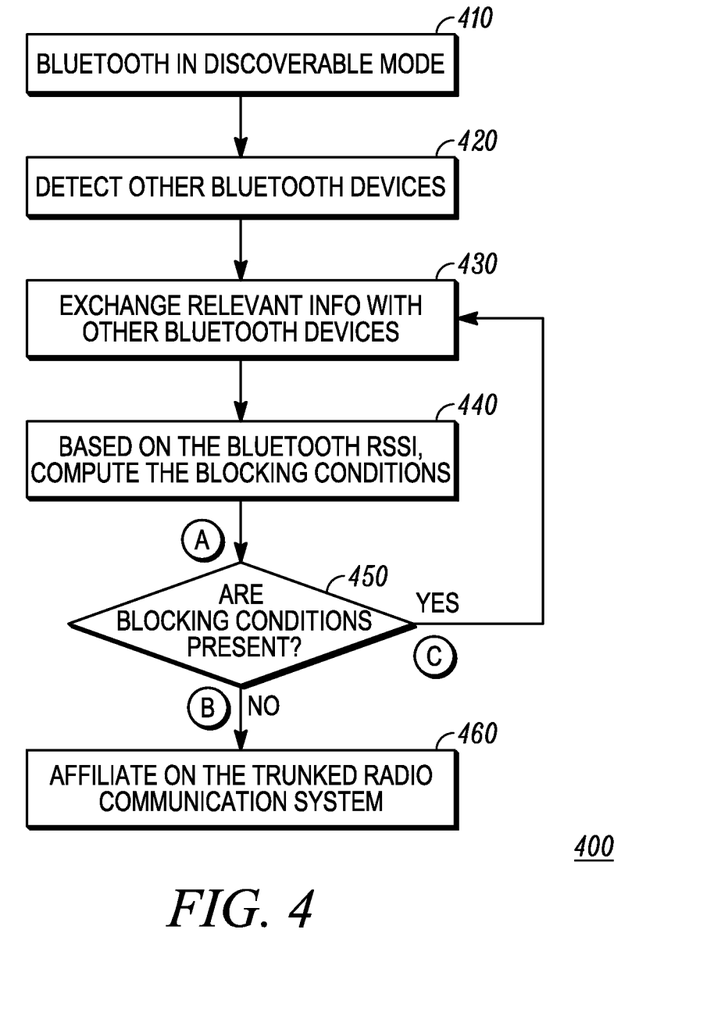
FIG. 4 is a flowchart illustrating a method of affiliation in accordance with some embodiments.

FIG. 4 is a flowchart illustrating a method of PTT affiliation.

Figure 5:
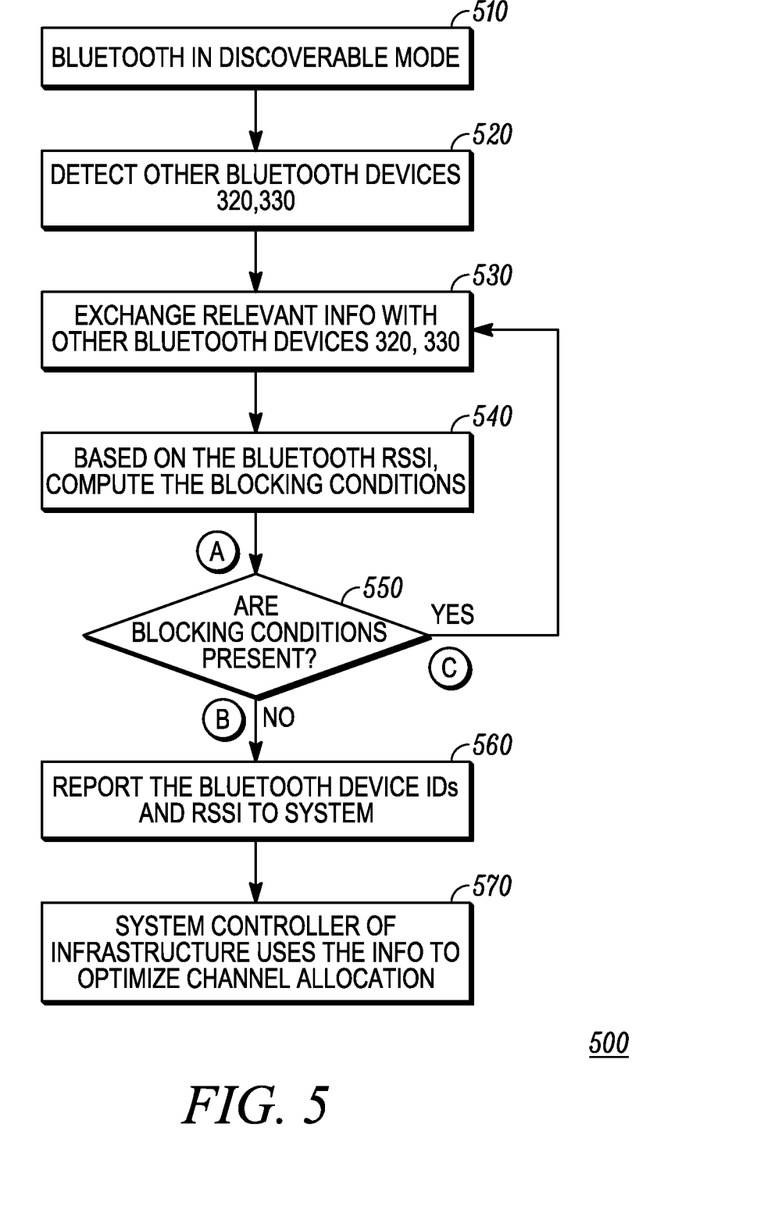
FIG. 5 is a flowchart illustrating a method of affiliation in accordance with other embodiments.

FIG. 5 is a flowchart illustrating a method of auto-affiliation.

FIG. 4 illustrates one embodiment of the operation of a mobile radio subscriber unit, such as first mobile radio subscriber unit 310 in FIG. 3. Where 'other Bluetooth' devices are referred to in the flowchart, these may for example be second and third mobile radio subscriber units 320 and 330 in FIG. 3.

At 410, first mobile radio subscriber unit 310 activates the 'discoverable mode' of Bluetooth. In this mode, a Bluetooth enabled device may sense the presence of other Bluetooth enables devices. At 420, first mobile radio subscriber unit 310 detects other devices with Bluetooth capability. At 430, first mobile radio subscriber unit 310 receives the Bluetooth identifications of the other Bluetooth devices, and computes the RSSI of the signals received from each device.

As indicated at 440, calculation of the RSSI enables an estimate of the distance between the devices. Thus first mobile radio subscriber unit 310 may calculate an estimate of first distance D12 and/or second distance D13 in FIG. 3. First mobile radio subscriber unit 310 may also calculate relative locations, of other mobile radio subscriber units 320, 330.

The result allows the calculation of factors that would lead to blocking of communication to or from first mobile radio subscriber unit 310. Such 'blocking' may be due to transmissions from nearby mobile radio subscriber units 320, 330 that would be sufficiently strong to block the receiver of first mobile radio subscriber unit 310, were first mobile radio subscriber unit 310 to attempt to affiliate. Such 'blocking' may, however, relate to transmissions from the first mobile radio subscriber unit 310, alone or together with other transmissions, that would be sufficient to block another mobile radio subscriber unit 320, 330.

From 440, the method moves to decision operation 450. Further details of a possible method in accordance with decision operation 450 of FIG. 4 are provided in FIG. 6. Points A, B and C on FIG. 4 correspond to points A, B and C on FIG. 6. In decision block 450, first mobile radio subscriber unit 310 decides whether blocking conditions are present. When they are, the method returns to 430. When the blocking conditions are not present, the method proceeds to 460.

At 460, first mobile radio subscriber unit 310 initiates transmissions to affiliate with the trunked radio communication system. First mobile radio subscriber unit 310 may then commence two-way communication. Such communication may be undertaken with greater confidence, than with known systems, that close proximity interference will either not occur, or will represent less of a problem.

FIG. 5 illustrates a flowchart for a method of auto-affiliation. Operations 510-550 of FIG. 5 correspond to operations 410-450 of the PTT affiliation process of FIG. 4. Points A, B and C on FIG. 5 correspond to points A, B and C on FIG. 6.

At 560 in FIG. 5, first mobile radio subscriber unit 310 reports information to the trunked mobile radio communication system. That information comprises the Bluetooth identifications of one or more mobile radio subscriber units, from which first mobile radio subscriber unit 310 has received information. Those units may be, for example, second and third mobile radio subscriber units 320 or 330. However, all the information received at 530, or computed at 540, may be provided to the trunked mobile radio communication system.

At 570, the infrastructure employs the information reported by first mobile radio subscriber unit 310, in channel allocation decisions. For example, the channels may be allocated in such a way as to reduce or minimize close proximity interference. The communication channel selected by the infrastructure for first mobile radio subscriber unit 310, from a set of available communication channels, may be a communication channel predicted to result in reduced blocking, or the lowest level of blocking, in a receiver of the first mobile radio subscriber unit 310. The communication channel selected may, however, be a communication channel predicted to result in the lowest level of blocking, or blocking below a threshold, in a receiver of another mobile radio subscriber unit 320, 330, due to transmissions from the first mobile radio subscriber unit 310.

First mobile radio subscriber unit 310 may be configured, at 530, to scan periodically for signals from the one or more other mobile radio subscriber units. When first mobile radio subscriber unit 310 attempts to affiliate with the trunked radio communication system, first mobile radio subscriber unit 310 may transmit information from the latest scan to the radio trunking system. This transmission may be together with the request for affiliation.

Figure 6:
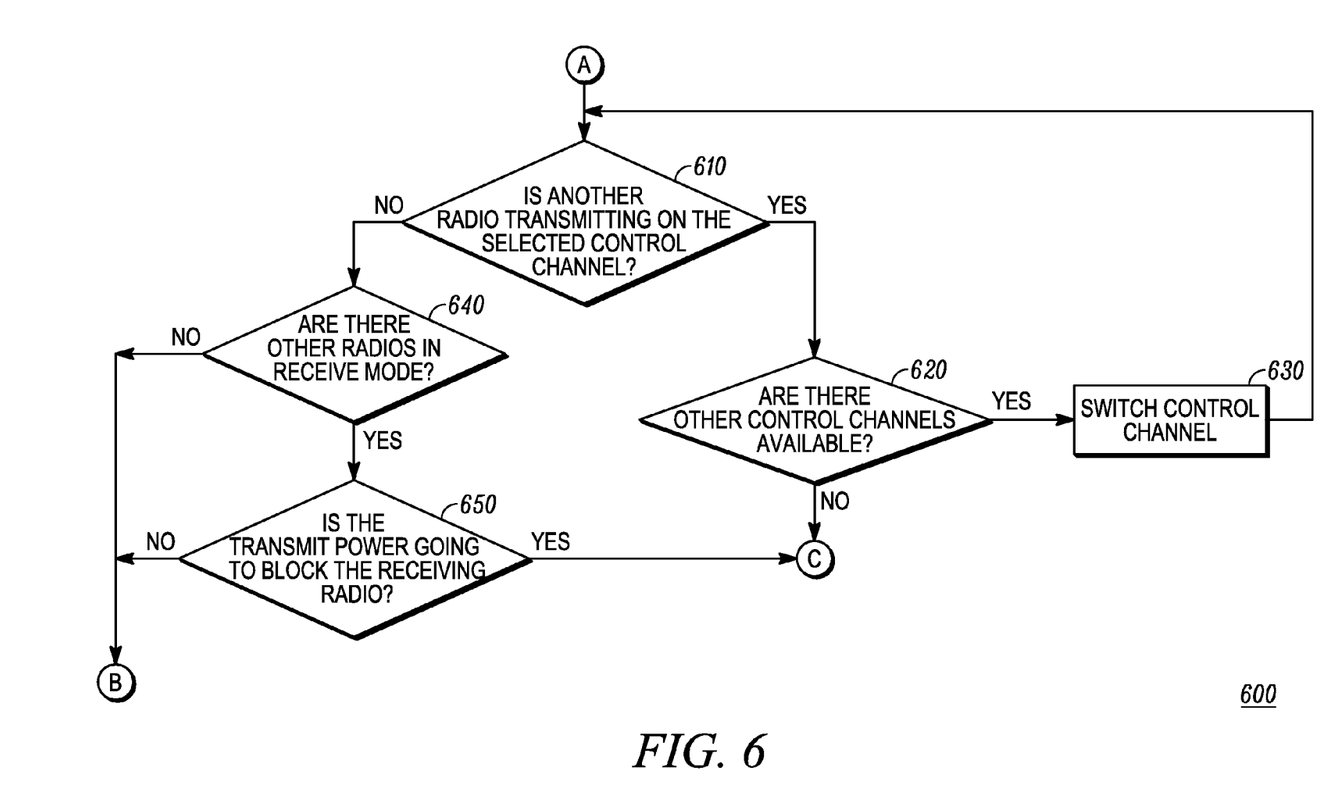
FIG. 6 shows further details of some embodiments of portions of the flowcharts of FIGS. 4 and 5.

FIG. 6 illustrates details of decision 450 and decision 550 of the flowcharts of FIGS. 4 and 5. FIG. 6 represents one method for deciding whether blocking conditions are present.

The method illustrated in FIG. 6 starts from point A of either FIG. 4 or FIG. 5. At 610, an initial decision is made about whether or not another mobile radio subscriber unit 320 or 330 is already using the control channel that first mobile radio subscriber unit 310 wants to use. When the answer is 'yes', then, at decision 620, first mobile radio subscriber unit 310 checks whether there are any more control channels available to it. When the answer is 'yes', then, at 630, first mobile radio subscriber unit 310 switches to another control channel, and repeats operations 610 and 620 of FIG. 6. When the answer at decision 620 is no, then the method returns to point C of either FIG. 4 or 5.

When the answer at decision 610 is 'no', then the method proceeds to decision 640 of FIG. 6. Here the first mobile radio subscriber unit 310 checks whether there are any other radios that have informed first mobile radio subscriber unit 310 that they are in receive mode. When the answer is 'no', then the method proceeds to point B of either FIG. 4 or 5.

When the answer at decision 640 of FIG. 6 is 'yes', then the method proceeds to decision 650. Here first mobile radio subscriber unit 310 checks whether transmissions from first mobile radio subscriber unit 310 would block the receiver(s) of radios that are known to be in receive mode. When the answer is 'yes' at decision 650, then the method returns to point C of either FIG. 4 or 5. When the answer is 'no' at decision 650, then the method progresses to point B of either FIG. 4 or 5.

In the methods of FIGS. 4-6, the Bluetooth subsystem in first mobile radio subscriber unit 310 may, after first being powered on, search for devices in a Personal Area Network (PAN). Any or all of the mobile radio subscriber units may do this. After detecting all the Bluetooth-capable devices in the PAN, the mobile radio subscriber units may exchange all relevant data/information. For each mobile radio subscriber unit, the data transmitted may include the unit's identity (ID) and the unit's activity. The activity would typically include whether the unit is currently transmitting and/or receiving. The data may also comprise control channel utilization information. RSSI values may also be exchanged.

Based on the Bluetooth information exchanged, one or more of the mobile radio subscriber units determines any blocking conditions. These could be any or all of: (i) there is just one control channel available, and it is already in use; (ii) there is another unit in receive mode, and the transmit power of the mobile radio subscriber unit trying to access the system would block this receiver, by itself or in combination with other mobile radio subscriber unit s; (iii) there is one mobile radio subscriber unit or more in transmit mode, and the receiver of the mobile radio subscriber unit trying to access the system would be blocked. For all these scenarios, the mobile radio subscriber unit trying to access the system will compute the interferer power based on the RSSI through Bluetooth discoverable mode. That mobile radio subscriber unit then makes a decision, based this level. When the power level is below a pre-determined level/threshold, then the decision will be to continue with the transmission. Otherwise, the decision will be to wait until the conditions change, and there is no longer a blocking condition. When computing interference power, the mobile radio subscriber unit may also add in signal power from other transmitters, such as base stations BS1, 350 and 360.

Once the mobile radio subscriber unit has access to the trunked radio communication system, in the method of FIG. 4 it will commence normal two-way radio communication. In the method of FIG. 5, it will also provide information about RSSI levels and other data about the other mobile radio subscriber units to the network infrastructure. The system controller 380, see FIG. 3, may be the part of the radio communication system that uses the information from the mobile radio subscriber unit 310. The system controller 380 can then optimize the channel allocation, and establish priorities when there are competing requests. Another processor of the infrastructure may, however, carry out these actions.

First radio subscriber unit 310 may also receive information about other mobile radio subscriber units 320 and 330, from the network infrastructure.

Figure 7:
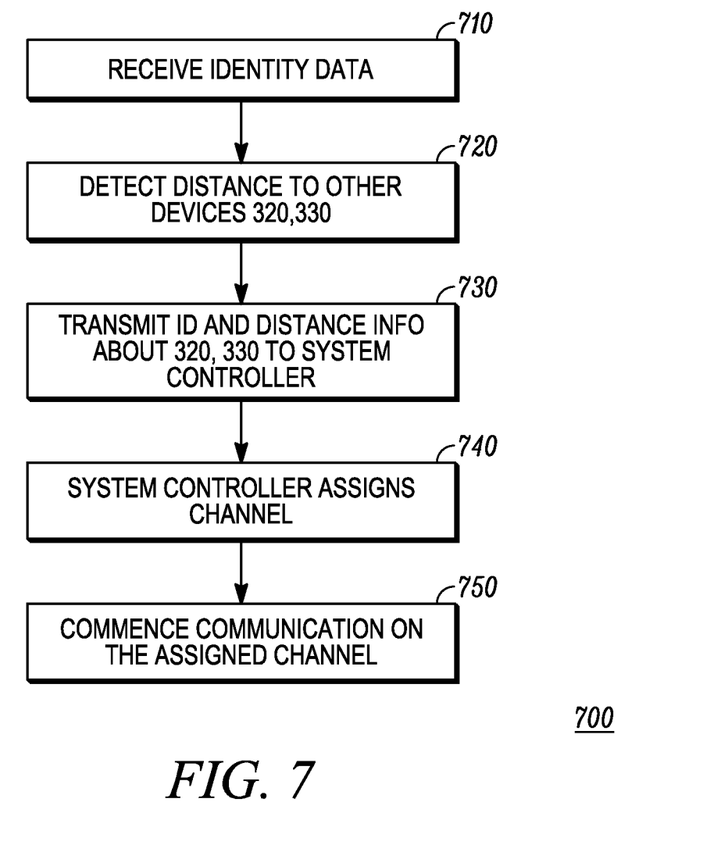

FIG. 7 illustrates another embodiment, as a flowchart. The method of FIG. 7 is a method of channel assignment in a trunked radio system. In the method of FIG. 7, the infrastructure of the trunked mobile radio communication system may determine the relative location of mobile radio subscriber units, based on information supplied by the first mobile radio subscriber unit 310 and/or at least one other mobile radio subscriber unit.

At 720, first mobile radio subscriber unit 310 receives identity data from one or more other mobile radio subscriber units, such as second or third mobile radio subscriber units 320, 330. At 720, first mobile radio subscriber unit 310 detects the distance from first mobile subscriber unit 310 to each of one or more other mobile radio subscriber units. At 730, first mobile radio subscriber unit 310 transmits information to the infrastructure, for example to system controller 380 via first base station 340. The information comprises the identity data and detected distances of the other mobile radio subscriber units. At 740, the infrastructure selects a communication channel for first mobile radio subscriber unit 310, from a set of available communication channels. The selected communication channel is chosen to reduce close proximity interference between first mobile radio subscriber unit 310 and the one or more other mobile radio subscriber units. System controller 380 of the infrastructure may carry out this channel assignment. System controller 380 may also assign channels to other mobile radio subscriber units, based on the information received from first mobile radio subscriber unit 310. At 750, having received an assigned channel for communication on the trunked two-way radio communication system, first mobile radio subscriber unit 310 commences communication.

As illustrated in FIG. 7, therefore, the Bluetooth signal strength information may be used to inform the radio trunked system about the relative location of nearby radio subscriber units. The radio system can then use this information to assign channels. Channel assignment can be arranged in such a way as to prevent or reduce close proximity interference between mobile radio subscriber units and/or a variety of types of radio transmitter. This assignment ensures that the frequency and timing of channel time slots that are assigned will prevent or reduce close proximity interference, when the mobile radio subscriber unit 310 transmits and/or receives. Algorithmic protocols within the radio communication system will optimize the channel and/or frequency assignment. For example, the infrastructure may distribute voice and/or data channels amongst the active mobile radio subscriber units on the basis of frequency, whereby a channel assigned to the first mobile radio subscriber unit will be assigned a frequency that differs by a minimum threshold, from frequencies assigned to active mobile radio subscriber units closest to first mobile radio subscriber unit 310. The infrastructure may not grant a voice and/or data channel to a requesting mobile radio subscriber unit, when the requesting mobile radio subscriber unit would experience close proximity interference above a threshold level.

The methods and apparatus disclosed may be applied in a variety of specific designs of radio system. However, examples where the methods and apparatus may be used include the following systems, and radio units for those systems: SmartZone, Association of Public-Safety Communications Officials (APCO) 25, and Terrestrial Trunked Radio (TETRA).

The methods and apparatus described here may also be implemented in specific applications. Many trunked radio systems currently deployed use a dedicated control (data) channel, common for all radios at a particular site, and multiple voice channels. The voice channels are dynamically assigned by the system to the different talkgroups. In such systems, there are different scenarios in which the radios are in close proximity. It is these situations in which information acquired through Bluetooth may particularly help to mitigate the blocking issue. Two cases, as outlined below, serve to illustrate the possibilities.

Case 1: Multiple mobile radio subscriber units belong to the same talkgroup, and use the same control channel. Here the control channel coordinates all the activities for all the users on the trunked system. Two or more mobile radio subscriber units may attempt to transmit simultaneously. For such simultaneous transmission, the two mobile radio subscriber units would need to use the same control channel. Without exchanging Bluetooth information, neither mobile radio subscriber unit will be able to access to the system. So the information exchanged via Bluetooth can help solve the problem, by prioritizing the control channel access. This access can be on a "First Come First Served" basis. The second of the two mobile radio subscriber units will recognise that there is a blocking condition, and not then attempt to transmit on the control channel. Other mobile radio subscriber units can be alerted about the control channel being used, thereby preventing other mobile radio subscriber units in the talkgroup from attempting to use the control channel, until it becomes free. In this case, each member of the talkgroup will perform a Bluetooth scan, and gather information about the neighboring mobile radio subscriber units. The mobile radio subscriber units which try to access the system and are not successful, will broadcast this information via Bluetooth. The first mobile radio subscriber unit that obtains access to the system will send (convey) the information to the trunking system. Then the trunking system will know which mobile radio subscriber units are in a queue for access to the control channel.

Case 2: Multiple mobile radio subscriber units belong to different talkgroups, and each talkgroup uses a different frequency for communication between mobile radio subscriber units. However, mobile radio subscriber units of all the talkgroups use the same control channel. In this case, again, mobile radio subscriber units trying to use the control channel may block each other, without the methods and apparatus described herein. However, there is also the possibility of mobile radio subscriber units using a voice channel, and blocking the control channel or other voice channels of other mobile radio subscriber units. The Bluetooth information exchanged among the mobile radio subscriber units in close proximity may then assist the system to optimize the frequency allocation. When that is not possible, the system can prioritize the access to the system, among the mobile radio subscriber unit s.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of initiating transmission by a mobile radio subscriber unit in a trunked radio system, the trunked radio system comprising an infrastructure and mobile radio subscriber units, the method comprising a first mobile radio subscriber unit:
   receiving data from at least one other radio subscriber unit, the data for each of the least one other radio subscriber units comprising identification data, and data about transmission and/or reception activity by each of the least one other radio subscriber units;
   determining the received signal power of signals from the least one other radio subscriber units;
   determining whether transmission by the first mobile radio subscriber unit would provide interference above a first pre-determined level, and/or reception by the first mobile radio subscriber unit would be subject to interference above a second pre-determined level; and
   delaying transmission, when transmission by the first mobile radio subscriber unit would provide interference above the first pre-determined level, or reception by the first mobile radio subscriber unit would be subject to interference above the second pre-determined level.

2. A method of initiating transmission as claimed in claim 1, wherein:
   determining the received signal power of signals from the least one other radio subscriber unit comprises the first mobile radio subscriber unit:
      using Bluetooth discoverable mode to receive Bluetooth transmissions from the at least one other radio subscriber unit;
      measuring the Received Signal Strength Information (RSSI) for received Bluetooth transmissions;
      computing the interference power that would result from transmission by the first mobile radio subscriber unit; and
   receiving the identification data comprises receiving a Bluetooth identity of the at least one other mobile radio subscriber unit.

3. A method of initiating transmission as claimed in claim 2, wherein the method further comprises the first mobile radio subscriber unit:
   determining whether the available control channels are all in use; and
   when the available control channels are all in use, delaying transmission.

4. A method of initiating transmission as claimed in claim 1, further comprising the first mobile radio subscriber unit:

estimating a distance between the first mobile radio subscriber unit and the at least one other mobile radio subscriber unit from the received signal power level; and/or
estimating a relative location of the first mobile radio subscriber unit and the at least one other mobile radio subscriber unit.

5. A method of initiating transmission as claimed in claim 1, further comprising the first mobile radio subscriber unit:
determining, from data about reception activity by the least one other mobile radio subscriber unit, that there is at least one other mobile radio subscriber unit in receive mode; and
determining whether transmission by the first mobile radio subscriber unit, alone or in combination with other transmitting mobile radio subscriber units, would block reception by the least one other mobile radio subscriber unit.

6. A method of initiating transmission as claimed in claim 1, further comprising the first mobile radio subscriber unit:
determining, from data about transmission activity by the at least one other mobile radio subscriber unit, whether there is at least one other mobile radio subscriber unit in transmit mode; and
determining whether transmissions by the at least one other mobile radio subscriber unit in transmit mode would block reception by the first mobile radio subscriber unit.

7. A method of initiating transmission as claimed in claim 1, wherein:
the data for each of the least one other mobile radio subscriber units comprises data concerning control channel utilization by each of the at least one other mobile radio subscriber units.

8. A method of initiating transmission as claimed in claim 1, further comprising first mobile radio subscriber unit providing, to the at least one other mobile radio subscriber unit:
Bluetooth identification data;
data about transmission/reception activity; and
data concerning control channel utilization.

9. A method of initiating transmission as claimed in claim 1, further comprising the first mobile radio subscriber unit:
initiating transmission to the infrastructure, the transmission comprising a request for access; and
transmitting, to the infrastructure:
the data from the at least one other mobile radio subscriber unit; and
the received signal power level of signals from the least one other mobile radio subscriber unit.

10. A mobile radio subscriber unit operable in a trunked radio system, the trunked radio system comprising an infrastructure and mobile radio subscriber units, wherein:
a receiver of the mobile radio subscriber unit is configured to receive data from at least one other mobile radio subscriber unit, the data for each of the least one other mobile radio subscriber units comprising identification data, and data about transmission/reception activity by each of the least one other mobile radio subscriber units;
a processing unit of the mobile radio subscriber unit is configured to:
determine the received signal power of signals from the least one other mobile radio subscriber units;
determine whether transmission by the first mobile radio subscriber unit would provide interference above a first pre-determined level, or reception by the first mobile radio subscriber unit would be subject to interference above a second pre-determined level, and
delay transmission, when transmission by the first mobile radio subscriber unit would provide interference above the first pre-determined level, or reception by the first mobile radio subscriber unit would be subject to interference above the second pre-determined level.

11. A mobile radio subscriber unit as claimed in claim 10, wherein the mobile radio subscriber unit, to determine the received signal power level of signals from the least one other radio subscriber, is further adapted to:
receive Bluetooth transmissions from the least one other radio subscriber unit, using Bluetooth discoverable mode;
measure the Received Signal Strength Information (RSSI), for received Bluetooth transmissions; and
compute the interference power that would result from transmission by the first mobile radio subscriber unit.

12. A method of channel assignment in a trunked radio system, the trunked radio system comprising an infrastructure and mobile radio subscriber units, the method comprising:
a first mobile radio subscriber unit receiving identity data from one or more other mobile radio subscriber units, and detecting the distance from the first mobile radio subscriber unit to each of the one or more other mobile radio subscriber units, wherein the first mobile radio subscriber unit communicates directly with the one or more other mobile radio subscriber units;
the first mobile radio subscriber unit transmitting information to the infrastructure, the information comprising the identity data, and detected distances of the one or more other mobile radio subscriber units;
the infrastructure selecting a communication channel for the first mobile radio subscriber unit, from a set of available communication channels, the selected communication channel being chosen to reduce close proximity interference between the first mobile radio subscriber unit and the one or more other mobile radio subscriber units.

13. A method of channel assignment as claimed in claim 12, further comprising:
at least a second mobile radio subscriber unit receiving identity data from one or more mobile radio subscriber units, and detecting the distance from the second mobile subscriber unit to each of the one or more mobile radio subscriber units, wherein the at least a second mobile radio subscriber unit communicates directly with the one or more mobile radio subscriber units;
the at least a second mobile radio subscriber unit transmitting further information to the infrastructure, the further information comprising the identity data and distances of the mobile radio subscriber units; and
the infrastructure using the information from the first mobile radio subscriber unit and the further information from the at least one second mobile radio subscriber unit, in selecting a communication channel for the first mobile radio subscriber unit, from the set of available communication channels.

14. A method of channel assignment as claimed in claim 12, wherein:
the first mobile radio subscriber unit receives identity data from each of the one or more other mobile radio subscriber units, the identity data comprising a Bluetooth address.

15. A method of channel assignment as claimed in claim 12, wherein:
the first mobile radio subscriber unit measures Received Signal Strength Information (RSSI) for Bluetooth signals from each of the one or more other mobile radio subscriber units, and uses the measured RSSI to detect the distance from the first mobile subscriber unit to each of the one or more other mobile radio subscriber units.

16. A method of channel assignment as claimed in claim 12 wherein:
the first mobile radio subscriber unit transmits information concerning the received identity data and distances of the one or more other mobile radio subscriber units to a system controller of the trunked radio system, together with a request for affiliation to the trunked radio system.

17. A method of channel assignment as claimed in claim 16, wherein:
the first mobile radio subscriber unit periodically scans for signals from the one or more other mobile radio subscriber units, and transmits information from the latest scan to the trunked radio system, together with the request for affiliation.

18. A method of channel assignment as claimed in claim 12, wherein:
the communication channel selected for the first mobile radio subscriber unit from the set of available communication channels is a communication channel predicted to result in the lowest level of blocking in a receiver of the first mobile radio subscriber unit.

19. A method of channel assignment as claimed in claim 12, wherein:
information is transmitted by at least a first mobile radio subscriber unit and a second mobile radio subscriber unit about identities and distances of mobile radio subscriber units; and
the information transmitted by at least the first mobile radio subscriber unit and the second mobile radio subscriber unit is used to determine the relative location of mobile radio subscriber units within the trunked radio system.

20. A method of channel assignment as claimed in claim 12, wherein:
the first mobile radio subscriber unit and the at least one other radio subscriber unit are members of a talkgroup; and
information is transmitted to the infrastructure by the first mobile radio subscriber unit that the at least one other radio is attempting to access a control channel, thereby allowing the infrastructure to set up a queue of subscriber radio units waiting to access the control channel.

21. A method of channel assignment as claimed in claim 12, wherein:
selecting a communication channel for the first mobile radio subscriber unit from a set of available communication channels comprises selection of a control channel.

22. A method of channel assignment as claimed in claim 12, wherein:
selecting a communication channel for the first mobile radio subscriber unit from a set of available communication channels comprises selection of a voice or data channel.

23. A method of channel assignment as claimed in claim 12, wherein:
the infrastructure distributes voice and/or data channels amongst the active mobile radio subscriber units, so as to reduce the close proximity interference experienced by active mobile radio subscriber units.

24. A method of channel assignment as claimed in claim 23, wherein:
the infrastructure distributes voice and/or data channels on the basis of frequency, whereby a channel assigned to the first mobile radio subscriber unit has a frequency differing by a minimum threshold, from frequencies assigned to active mobile radio subscriber units closest to the first mobile radio subscriber unit.

25. A method of channel assignment as claimed in claim 12, wherein:
the infrastructure does not grant a voice and/or data channel to a requesting mobile radio subscriber unit, when the requesting mobile radio subscriber unit would experience close proximity interference above a threshold level.

\* \* \* \* \*

UNITED STATES PATENT AND TRADEMARK OFFICE
CERTIFICATE OF CORRECTION

PATENT NO. : 8,725,080 B2  
APPLICATION NO. : 13/339624  
DATED : May 13, 2014  
INVENTOR(S) : Daniela Stankovska et al.

Page 1 of 1

It is certified that error appears in the above-identified patent and that said Letters Patent is hereby corrected as shown below:

On the title page

On Page 2, item 56, under "OTHER PUBLICATIONS", in Column 2, Line 1, delete "Assingment" and insert -- Assignment --, therefor.

On Page 2, item 56, under "OTHER PUBLICATIONS", in Column 2, Line 3, delete "Assigment" and insert -- Assignment --, therefor.

In the specification

In Column 1, Line 19, delete "116, 117, 118," and insert -- 116, 118, --, therefor.

In Column 1, Line 25, delete "116, 117, 118," and insert -- 116, 118, --, therefor.

In Column 8, Line 45, delete "subscriber unit s;" and insert -- subscriber units; --, therefor.

In Column 10, Line 59, delete "unit s." and insert -- units. --, therefor.

In the claims

In Column 15, Line 4, in Claim 16, delete "claim 12" and insert -- claim 12, --, therefor.

Signed and Sealed this  
Twelfth Day of April, 2016

Michelle K. Lee  
*Director of the United States Patent and Trademark Office*